(12) United States Patent
Penning De Vries et al.

(10) Patent No.: US 10,289,213 B2
(45) Date of Patent: May 14, 2019

(54) REMOTE CONTROL DEVICE, USER DEVICE AND SYSTEM THEREOF, AND METHOD, COMPUTER PROGRAM PRODUCT AND IDENTIFICATION SIGNAL

(71) Applicant: KONINKLIJKE PHILIPS N.V., Eindhoven (NL)

(72) Inventors: Hendricus Theodorus Gerardus Maria Penning De Vries, Mierlo (NL); Henk Kok, Tilburg (NL); Johannes Yzebrand Tichelaar, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 2 days.

(21) Appl. No.: 15/506,282

(22) PCT Filed: Sep. 28, 2015

(86) PCT No.: PCT/EP2015/072287
§ 371 (c)(1),
(2) Date: Feb. 24, 2017

(87) PCT Pub. No.: WO2016/050708
PCT Pub. Date: Apr. 7, 2016

(65) Prior Publication Data
US 2018/0217677 A1 Aug. 2, 2018

(30) Foreign Application Priority Data
Sep. 29, 2014 (EP) .................................. 14186731

(51) Int. Cl.
*H04B 10/00* (2013.01)
*G06F 3/03* (2006.01)
(Continued)

(52) U.S. Cl.
CPC ........... *G06F 3/0304* (2013.01); *G08C 17/00* (2013.01); *G08C 23/04* (2013.01);
(Continued)

(58) Field of Classification Search
None
See application file for complete search history.

(56) References Cited

U.S. PATENT DOCUMENTS

| 6,655,817 B2 | 12/2003 | Devlin et al. |
| 2006/0056855 A1* | 3/2006 | Nakagawa ................ G09F 9/33 398/183 |

(Continued)

FOREIGN PATENT DOCUMENTS

| WO | 03056531 A1 | 7/2003 |
| WO | 2004047011 A2 | 6/2004 |

(Continued)

*Primary Examiner* — Kenneth N Vanderpuye
*Assistant Examiner* — David W Lambert

(57) ABSTRACT

The invention is directed at a remote control device for controlling one or more user devices, comprising a directional optical sensor for receiving one or more optical signals from the user devices and for detecting an incoming direction of said received optical signals, and a processor. For identification of at least one of said user devices, the processor is arranged for analyzing at least one of said received optical signals for associating thereof with the at least one of said user devices and for keeping track of the at least one of said optical signals upon changing of said incoming direction. The one or more optical signals comprise high and low signal states, wherein each optical signal consists of one or more signal fragments. Each signal fragment comprising a leading or trailing low signal state and a high signal state, wherein a duration of the high signal state determines a signal fragment type of the signal fragment and wherein said duration of the high signal state is longer than a duration of the low signal state. The processor (Continued)

is arranged for performing said associating of said at least one received optical signal with the at least one of said user devices by recognition of the one or more signal fragments and associating each signal fragment with its signal fragment type for obtaining therefrom a signal pattern which is uniquely associable with said at least one of said user devices.

15 Claims, 4 Drawing Sheets

(51) Int. Cl.
  *G08C 17/00* (2006.01)
  *G08C 23/04* (2006.01)
  *H05B 37/02* (2006.01)
(52) U.S. Cl.
  CPC ..... *H05B 37/0272* (2013.01); *G08C 2201/20* (2013.01); *G08C 2201/71* (2013.01); *G08C 2201/92* (2013.01)

(56) References Cited

U.S. PATENT DOCUMENTS

| | | | |
|---|---|---|---|
| 2006/0161812 A1* | 7/2006 | Lee | G08C 19/28 714/18 |
| 2008/0253472 A1* | 10/2008 | Griep | G08C 23/04 375/295 |
| 2009/0146834 A1 | 6/2009 | Huang | |
| 2009/0189776 A1* | 7/2009 | Cheron | G08C 19/28 340/12.1 |
| 2010/0253624 A1 | 10/2010 | Wilson | |
| 2012/0025949 A1* | 2/2012 | Reed | H04B 10/1149 340/5.7 |
| 2013/0181813 A1 | 7/2013 | Norlen et al. | |
| 2014/0193157 A1 | 7/2014 | Du et al. | |

FOREIGN PATENT DOCUMENTS

| | | | | |
|---|---|---|---|---|
| WO | 2006079939 A2 | 8/2006 | | |
| WO | WO 2006079939 A2 * | 8/2006 | ............. | G08C 17/00 |
| WO | 2009150581 A1 | 12/2009 | | |

* cited by examiner

REMOTE CONTROL DEVICE, USER DEVICE AND SYSTEM THEREOF, AND METHOD, COMPUTER PROGRAM PRODUCT AND IDENTIFICATION SIGNAL

CROSS-REFERENCE TO PRIOR APPLICATIONS

This application is the U.S. National Phase application under 35 U.S.C. § 371 of International Application No. PCT/EP2015/072287, filed on Sep. 28, 2015, which claims the benefit of European Patent Application No. 14186731.7, filed on Sep. 29, 2014. These applications are hereby incorporated by reference herein.

FIELD OF THE INVENTION

The present invention is directed at a remote control device for controlling one or more user devices, comprising a directional optical sensor for receiving one or more optical signals from the user devices. The invention is further directed at a user device arranged for being operated by means of a remote control device as described, wherein the user device comprises an optical transmitter for transmitting an optical signal, and a modulator cooperating with the optical transmitter for modulating the optical signal. The invention is further directed at a method of operating a remote control device, a method of composing an optical signal for identification in a user device, and computer program products for performing such methods. Moreover, the invention relates to an optical identification signal.

BACKGROUND

In most living rooms multiple user devices may be present that can be controlled with a remote control from a distance. Traditionally, such devices include televisions, audio systems and DVD or Blu-ray players, but the number of remotely controllable devices is steadily growing. For example there can be lamps allowing to remotely set color or dimming levels. Another example is an air control system where the air flow or temperature may be controlled.

A known problem is that the number of different remote control devices in a traditional setup corresponds with the number of remotely controllable devices present in the room, i.e. each device has its own remote controller. To users this is experienced as a nuisance, e.g. having to find the correct remote controller or requiring to understand all the functions that are available for control. Already for quite some years, this has led to the integration of control functions for various devices into one controller, and the development of universal controllers that can be programmed to be associated with various devices. With the wide spreading and development of smart phones and tablets, such functions may nowadays be controlled via applications with dedicated menus.

The above developments, however, do not completely resolve the problem. Most remote controllers or apps are still only suitable for controlling certain types of devices, e.g. only lighting or only multimedia devices. Moreover, the existing solutions do not provide a solution in the case a multitude of devices (e.g. lamps) of the same type is to be controlled. The control application needs to know the address of the lamp that needs to be controlled. The user may try to remember device addresses, but that gets difficult when the number of devices grows and evidently this is not the most user friendly solution.

Some remote controllers are nowadays available that allow selection of a to-be-controlled user device by means of pointing to the device. An example of such a remote controller device is described in International patent application WO 2006/079939. This document describes a pointing device that can be pointed at user device to-be-controlled, and that sends triggers targeted to each device sequentially to cause these devices to send a visual identifier. The system described assists in overcoming some of the above described issues, although some user action is required to target the desired device for triggering.

SUMMARY OF THE INVENTION

As an object of the present invention it is desired to provide a remote control device and remote control system for controlling user devices with optimal performance in terms of response time. Moreover, it is also desired to provide a system that is energy efficient at least on the side of the remote controller. It is also desired to provide a system that is reliable in operation, and easy to use.

To this end, there is provided herewith a remote control device for controlling one or more user devices, comprising a directional optical sensor for receiving one or more optical signals from the user devices and for detecting an incoming direction of said received optical signals, and a processor, wherein, for identification of at least one of said user devices, the processor is arranged for analyzing at least one of said received optical signals for associating thereof with the at least one of said user devices and for keeping track of the at least one of said optical signals upon changing of said incoming direction, wherein the one or more optical signals comprise high and low signal states, and wherein each optical signal consists of one or more signal fragments, each signal fragment comprising a leading or trailing low signal state and a high signal state, wherein a duration of the high signal state determines a signal fragment type of the signal fragment and wherein said duration of the high signal state is longer than a duration of the low signal state, and wherein the processor is arranged for performing said associating of said at least one received optical signal with the at least one of said user devices by recognition of the one or more signal fragments and associating each signal fragment with its signal fragment type for obtaining therefrom a signal pattern which is uniquely associable with said at least one of said user devices.

The remote control device of the present invention applies a directional optical sensor for receiving optical signals transmitted by user devices with which the remote control device has a direct line of sight. The optical sensor is directional in the sense that it is able to establish an incoming direction or differences between incoming directions of received optical signals. For example, in an embodiment the directional optical sensor allows to establish an angle between the incoming direction of the received optical signal and e.g. the central axis perpendicular to the sensor surface. In a different embodiment the optical sensor provides an image of the field of view from which positional coordinates of a received optical signal can be derived, indicating the relative location of the source of the incoming optical signal with respect to the sensor.

As a result, the remote control device allows a user to point the device in a direction of a user device comprising an optical transmitter, and receive the optical signal transmitted by the device as well as its relative location with respect to the remote control device. The remote control device of the present invention may for example use this incoming direction for establishing which device the user is pointing at, and thereby selecting an optical signal from the received optical signals as being the optical signal belonging to the device of interest. For example, the optical signal being closest to image sensor center or having the smallest angle with the transverse central axis through the sensor surface may be considered as belonging to the device pointed at by the user. Alternatively, selection of an optical signal based on the information on the incoming direction of the signal may be performed differently, e.g. by selecting multiple optical signals.

Having found an optical signal for selection, the processor is arranged for associating the at least one received optical signal with the at least one of said user devices. To do so, the processor of the remote control device has to keep track of the optical signal such as to enable analysis thereof for identification of an associated user device. A user's hand is in practice not steady, and the incoming direction of the optical signal is thus changing continuously. To enable associating the optical signal with a corresponding device it is important that the signal does not get lost, e.g. because the remote controller may loose track as a result of the constant change of incoming direction.

The received optical signals from the user devices, in accordance with the present invention, comprise high and low signal states, for example high and low optical intensities. Each optical signal consists of one or more signal fragments, and each signal fragment comprises a leading or trailing low signal state and a high signal state. The duration of the high signal state determines a signal fragment type of the signal fragment; this could be a specific value of the signal fragment or a bit combination, or it could be an indication that the fragment resembles a header or trailer fragment. By recognition of the one or more signal fragments and associating each signal fragment with its signal fragment type, the processor obtains a signal pattern from the at least one of said received optical signals which is uniquely associable with said at least one of said user devices.

Moreover, the duration (at least during transmission of identification information) of the high signal state is longer than a duration of the low signal state. The optical signals established in this way, are optimized for being 'followable' by the remote control device. This is due to the fact that low states cannot be followed as there is no light. For example, if the optical signal is an on-off modulated optical signal, it is important that the provided optical signal consists mainly of 'on' states with only few 'off' states. This is due to the fact that the optical signal can be easily followed as long as it is in 'on' state (or high signal state). However, while being in the 'off' state, the remote control loses track of the signal.

In a preferred embodiment the leading or trailing low signal states of the signal fragments are of a fixed duration. This fixed duration may be minimized with respect to said duration of said high signal state. For example, the duration of the low signal state of each signal fragment may be only just sufficiently long for enabling detection of the low signal state by the remote control device. The payload information carried within each signal fraction is coded in the duration of the high signal state, the duration of which differs with the type of signal fragment. The processor is arranged for detecting the low signal states for distinguishing said one or more signal fragments from each other within the at least one received optical signal. Each time a low signal state is detected, the remote controller is made aware of a next signal fragment being received. By determining the duration of the high signal state, the processor is able to determine the signal fragment type, telling the processor whether it has received a header, trailer, or payload data type of signal fragment. The latter could include a particular value, bit or bit combination encoded in the length (i.e. duration) of the high signal state.

In accordance with an embodiment, the received optical signals represent binary signals formed of sequences of bits, wherein for each signal fragment the high signal states are formed of one or more high bits and the low signal states are formed of at least one low bit. The high signal states could be bit value '1', while the low signal states could be bit value '0'. A signal fragment could thus for example be formed of a leading or trailing low signal state of fixed duration and a high signal state of a length corresponding with a desired signal fragment type, and could thus for example be resembled by '011111', or '111110', or even '0111110'. The number of consecutive bits herein relates to a given signal fragment type, e.g. a header signal fragment. Other signal fragment types could for example relate to fragment values encoded by the number of consecutive 1's in the fragment. For example, the value may encode a bit pair of an identifier (e.g. '00', '01', '10', '11'). Value '00' could be encoded by a single '1' in the signal fragment, which would yield a signal fragment: '01' (or '10', or '010'). Value '01' could be encoded by a two consecutive 1's in the signal fragment, which would yield a signal fragment: '011' (or '110', or '0110'). Value '10' could be encoded by a three consecutive 1's in the signal fragment, which would yield a signal fragment: '0111' (or '1110', or '01110'). Value '11' could be encoded by a four consecutive 1's in the signal fragment, which would yield a signal fragment: '01111' (or '11110', or '011110'). The trailer signal fragment may be simply '0', or could even be absent as long as the header can be recognized (for the same reason, suppose the signal fragments include a recognizable trailer, then the header could be absent).

As will be appreciated, this also allows different manners of encoding, e.g. based on bit triplets or groupings of even more bits. A unique identifier number of the user device, e.g. '11011001' (decimal: 217) would thus render the combination '11'-'01'-'10'-'01'. The corresponding signal fragments would thus be the header '011111' followed by '01111', '011', '0111', and '011', and the trailer '0'. This yields the full signal: '01111101111101101110110' (total length: 22 bits). A different unique identifier, e.g. '01000001' (decimal: 65) would yield a full signal: '01111101101010110' (total length: 17 bits). As a result of the signal fragments being of different length, the total signal likewise is of different length.

In accordance with a further embodiment, the processor is arranged for determining the number of consecutive high bits from each signal fragment, and for determining the signal fragment type from the number of high bits. For example, in case the directional optical sensor of the remote control device may be a camera providing image frames at a given frame rate to the processor, a single bit in the optical signal may be set to endure predefined but at least three consecutive image frames. This allows for larger clock offsets and relaxed timing jitter (could be different for low and hi signal states and in between packet spaces). By counting the number of frames during which a high signal state is received by the directional optical sensor for the given signal fragment, the processor is able to establish the number of consecutive 1's in the signal fragment. Thereby, the processor can establish whether the received signal fragment is a header, a trailer, or a payload signal fragment representing a specific value.

As already explained hereinabove, in accordance with an embodiment, the processor of the remote control device is arranged for converting the signal fragment type into a signal fragment value, and for combining the signal fragment values of one or more signal fragments for obtaining a binary identifier associated with the at least one of said user devices. A possible manner of encoding has been extensively described above, and the logic therein may be applied for decoding the received signal fragments and establishing their types and values.

Moreover, in accordance with yet another embodiment, the processor is arranged for selecting the at least one of said received optical signals for analyzing thereof, wherein the selection is dependent on a detected incoming direction of said received optical signals. The selection may be performed either before, during or after the processor performs the analysis of the at least one optical signal, whichever implementation is desired. In some embodiments, selection may be performed prior to analysis, allowing the processor to focus on only one optical signal being tracked. In other embodiments, the processor analyses all received optical signals and also keeps track of them, and thereafter selects one or more optical signals of interest while discarding other received optical signals.

The remote control device, in accordance with another embodiment, further comprises input means for receiving input from a user and a transmitter for transmitting control commands to the identified at least one of said user devices for control thereof by the user. After identification of the user device pointed at by the user, the remote control device may be enabled to switch to a control module which is designed for controlling the selected device. Such a control module may for example include a user interfaces and control commands that may be stored in a memory of the remote control device, or could be embodied in different hardware or software coded control modules that are either external to the remote control device or integrated therein. The further steps of receiving user input and transmitting a control command may be implemented using standard protocols. As may be appreciated, the remote control device may include other elements, such as a display screen for displaying information or a user interface. The input means could include a touch sensitive display screen wherein input and output functions are combined. Optional, input may also be obtained via gesture detection e.g. based on camera data or motion sensor data, e.g. received from a motion sensor (not shown) like for instance an accelerometer (not shown).

Different embodiments of the remote control device in accordance with the present invention may be based on different types of directional optical sensors. For example, in accordance with an embodiment, the directional optical sensor is a camera for providing images to the processor for performing said analysis. However, in accordance with another embodiment, the directional optical sensor comprises a suitable arrangement or grouping of p-i-n photo-diodes (shortly: PIN diodes) which allows to establish the incoming direction of received optical signals.

In accordance with a second aspect of the invention, there is provided a user device arranged for being operated by means of a remote control device in accordance with the first aspect, wherein the user device comprises an optical transmitter for transmitting an optical signal, and a modulator cooperating with the optical transmitter for modulating the optical signal such that it comprises high and low signal states, and such that each optical signal consists of one or more signal fragments, each signal fragment comprising a leading or trailing low signal state and a high signal state, wherein a duration of the high signal state determines a signal fragment type of the signal fragment and wherein said duration of the high signal state is longer than a duration of the low signal state, the user device further comprising a controller cooperating with the modulator for enabling modulation of the optical signal in accordance with a signal pattern consisting of signal fragments of a combination of signal fragment types associated with the user device.

Such a user device could include all kinds of devices, such as lamps, a heating system, a thermostat, a radio, a media player, a television, etc. The invention may be implemented in any device that allows to be remotely controlled by a remote controller. It is also possible that a user device is connected to an intermediate control unit which comprises the optical transmitter, modulator and controller as described above. In many embodiments, the user device may further comprise a receiver for receiving control commands from the remote control device for control of said user device.

As also described above, the leading or trailing low signal states of the signal fragments may be of a fixed duration which is minimized with respect to said duration of said high signal state. Moreover, in an embodiment, the modulator is arranged for modulating the optical signals such as to represent binary signals formed of sequences of bits, wherein for each signal fragment the high signal states are formed of one or more high bits and the low signal states are formed of at least one low bit, the controller being further arranged for converting sequences of one or more bits representing an identifier into signal fragments consisting of at least one low bit and a plurality of high bits, the number of high bits representing a signal fragment type.

In accordance with yet a third aspect of the invention, there is provided a system comprising at least one remote control device in accordance with the first aspect, and at least one user device in accordance with the second aspect.

The invention, in accordance with a fourth aspect thereof, further relates to a method of operating a remote control device for controlling one or more user devices, the method comprising: receiving, using a directional optical sensor, one or more optical signals from the user devices and detecting an incoming direction of said received optical signals; identifying at least one of said user devices by analyzing, by a processor, at least one of said received optical signals for associating thereof with the at least one of said user devices and for keeping track of the at least one of said optical signals upon changing of said incoming direction; wherein for performing said step of identifying the one or more optical signals comprise high and low signal states, and wherein each optical signal consists of one or more signal fragments, each signal fragment comprising a leading or trailing low signal state and a high signal state, wherein a duration of the high signal state determines a signal fragment type of the signal fragment and wherein said duration of the high signal state is longer than a duration of the low signal state, and wherein the step of associating of said at least one received optical signal with the at least one of said user devices is performed by the processor by a step of recognizing of the one or more signal fragments and associating each signal fragment with its signal fragment type for obtaining therefrom a signal pattern which is uniquely associable with said at least one of said user devices.

The invention, in accordance with a fifth aspect thereof, further relates to a method of composing an optical signal for identification in a user device comprising an optical transmitter, wherein the method comprises: modulating, using a modulator cooperating with the optical transmitter, an optical signal such that it comprises high and low signal states, and such that each optical signal consists of one or more signal fragments, each signal fragment comprising a leading or trailing low signal state and a high signal state, wherein a duration of the high signal state determines a signal fragment type of the signal fragment and wherein said duration of the high signal state is longer than a duration of the low signal state, providing, by a controller, a data signal to the modulator for enabling modulation of the optical signal in accordance with a signal pattern consisting of signal fragments of a combination of signal fragment types associated with the user device; and transmitting the optical signal by means of the optical transmitter.

Moreover, in accordance with a sixth and seventh aspect of the invention, there is respectively provided computer program products for implementing the methods in accordance with the fourth and fifth aspect.

The invention, in accordance with an eighth aspect, is directed at an optical identification signal comprising high and low signal states, and wherein the optical signal consists of one or more signal fragments, each signal fragment comprising a leading or trailing low signal state and a high signal state, wherein a duration of the high signal state determines a signal fragment type of the signal fragment and wherein said duration of the high signal state is longer than a duration of the low signal state, the one or more signal fragments being of different length depending on said duration of the high signal state, the one or more signal fragments together forming a signal pattern consisting of signal fragments of a combination of signal fragment types, said combination representing an identifier associated with a device. As described, an optical signal as provided therewith allows to carry data including an identifier, while being optimized for enabling to keep track of the signal by a remote control device in accordance with the first aspect, in case the remote control device is not steadily held by a user while pointing at a user device. This type of signal is therefore advantageous for conveying an identifier signal remotely via an air interface to a hand held device receiving it.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
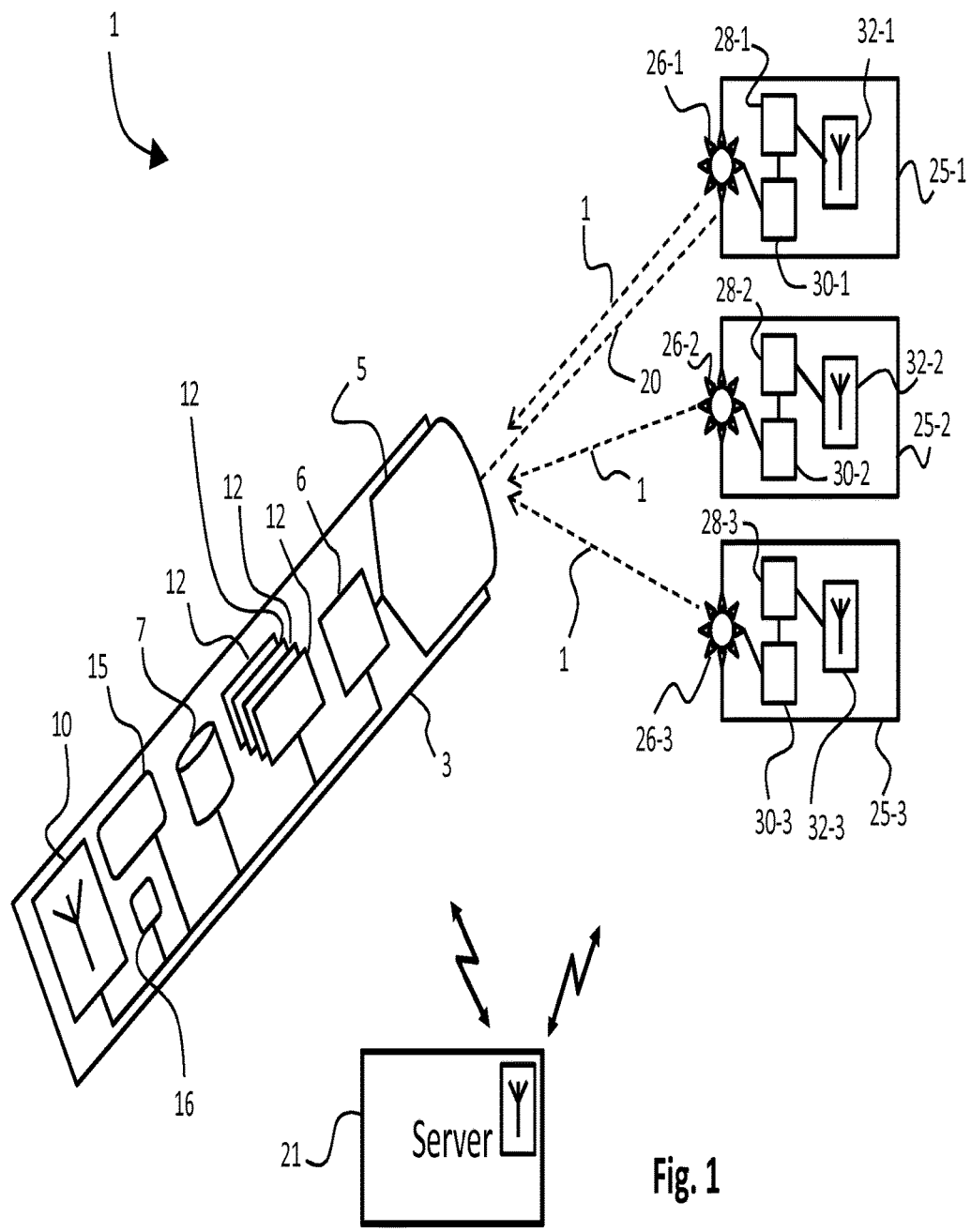
FIG. 1 schematically illustrates a system, remote control device, and user device in accordance with the present invention.

In FIG. 1, the system 1 comprises a remote control device 3 and a plurality of user devices 25-1, 25-2 and 25-3. The remote control device 3 comprises a directional optical sensor 5. The directional optical sensor 5 may for example be a camera that provides images to the processor 6 for further analysis thereof. The remote control 3 also comprises a plurality of control modules 12, which may be hardware control modules or software coded modules. Alternatively, the control modules may be external control modules. Further, a memory or data storage unit 7 and a wireless data communication unit 10 may be comprised by the remote control device 3. The data communication unit 10 may apply any suitable data communication protocol suitable for controlling user devices, e.g. a radio interface or optical transmission. Also included in remote control device 3 there may be a (standard or touch sensitive) display screen 15, for providing information to a user and/or receive input from the user. Moreover, the remote control device 3 may also comprise a keyboard comprising a number of input keys, such as knob 16 for receiving input from the user. Optional, input may also be obtained via gesture detection e.g. based on camera data or motion sensor data, e.g. received from a motion sensor (not shown) like for instance an accelerometer (not shown).

Each of the user devices 25-1, 25-2, and 25-3 at least comprises a number of elements that enable to provide the remote control device 3 with the device identifier, and to receive or exchange control data such as control commands from the remote control device 3. In FIG. 1, corresponding elements of each user device 25-1 to 25-3 is indicated with a similar reference numeral comprising a prefix-1, -2, or -3 such as to refer to the respective corresponding user devices 25-1, 25-2, 25-3. Below, the elements of user device 25-1 will be described in more details, but this description likewise applies to the corresponding elements of user device 25-2 and that of user device 25-3.

User device 25-1 comprises a controller 28-1. The user device 25-1 may have a memory (not shown), e.g. including therein a stored device identified, although this is not required. An identifier may be made available in device 25-1 in a different manner, e.g. by means of a hardware configurable solution (not shown) such as a set of jumper elements or dip switches. The device 25-1 further comprises an optical transmitter 26-1 which is arranged for providing an optical signal that may be received by remote control device 3. The optical signal provided by optical transmitter 26-1 may for example be an infrared optical signal, although this is not required per se (an optical signal of any other wavelength may also be applied). The optical signal transmitted by optical transmittal 26-1 is an intensity modulated optical signal which is generated using a modulator 30-1 under the control of controller 28-1. In particular, the controller 28-1 encodes a binary identifier of user device 25-1 into a plurality of signal fragments, including a header and/or trailer fragment at the beginning or end of the sequence. Although both a header and a trailer may be included in the optical signal, this is not required in all implementations. In other embodiments either the header or the trailer may be absent, and even both the header and trailer may be absent in embodiments wherein the first and last signal fragments may be otherwise recognized. Consecutively, the signal fragments assembled are used by the controller 28-1 for controlling the modulator 30-1 such as to modulate the optical signal transmitted by optical transmitter 26-1 to be composed of the signal fragments assembled. The manner of coding the identifier of user device 25-1 into the various signal fragments will be explained later. User devices 25-2 and 25-3 operate in a similar manner. Optionally, the identifiers may be preprogrammed in a memory or other element of the devices 25-1, 25-2, or 25-3. However, another option is that such identifiers are provided by or managed using a server. This server could be external to the remote control device 3 and to the other devices 25-1 to 25-3, or could be integrated with any of the devices (3, 25-1, 25-2, 25-3) present in the system. In FIG. 1 an optional server or management unit 21 is shown that interfaces both device 3 and devices 25, such as to keep the design of device 3 simple. This server or management unit 21 can be responsible for handing out (local network unique) identifiers like an internet address. Identifiers might also be hardcoded at the media access layer or data link layer (OSI model) and unique like or being a MAC address in most IEEE 802 network technologies like Ethernet, 802.11 wireless networks, Bluetooth, etc. Another identifier assignment could be based on pairing techniques where a control device is brought in close contact to the beacon after which the control device recognizes the beacon and assigns an identification code.

In the system illustrated in FIG. 1, there are three devices 25-1, 25-2 and 25-3 that can be controlled. These devices may represent lamps, photo frames, air control devices, audio systems, game consoles, televisions, media players, etc. Each device 25-1, 25-2 and 25-3 comprises an optical transmitter 26-1, 26-2 and 26-3 that is operable as a beacon for optical communication with the remote control device 3. The beacons 26-1, 26-2 and 26-3 are arranged for transmitting an optical modulated signal at infrared wavelength. The optical signal is preferably omnidirectional, i.e. transmitted in many directions and not particularly focused in a specific direction, such that it can be received in a large part of the room wherein the devices 25-1 to 25-3 are located.

The beacons 26-1 to 26-3 send out an optical signal comprising a code containing their device identification information. The devices 25-1 to 25-3 may be arranged for sending out the code continuously while switched on, or may be arranged for sending out the code in response to any event or trigger signal. For example, in some embodiments, a general trigger may be transmitted by the remote control device 3 when it is picked up by a user, e.g. in response to a signal from an acceleration sensor (not shown) comprised by the remote control device 3. In other embodiments, a user may operate knob 16 on the remote control device 3 to send a general trigger signal.

To identify a specific device 25-1 for control thereof, the user points with the remote device 3 in the direction of the device 25-1 that he wants to select. The camera 5 in the remote control device 3 captures an image that could look the image illustrated in FIG. 2.

Figure 2:
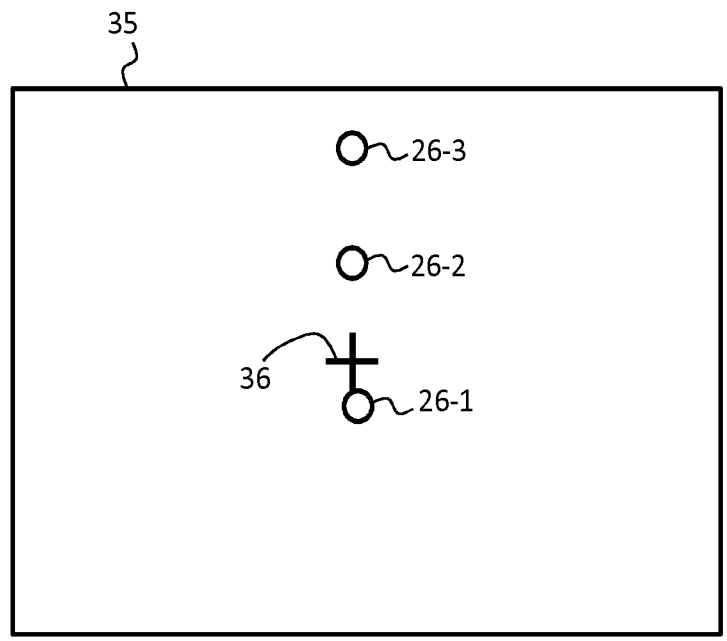
FIG. 2 schematically illustrates an image received by the remote control device of FIG. 1.

In case the optical sensor 5 has a large view angle, a number of beacons 26-1, 26-2 and 26-3 will be visible in the image as illustrated in FIG. 2. Further, as result of the optics of the optical sensor 5, the sensor image 35 is a mirrored projection of the environment imaged (point-symmetric vis-à-vis the center 36 of the image, with top becoming bottom, and left becoming right). Devices that are seen by the camera under different angles with respect to the central axis will be presented at different locations on the image 35. However, in order not to obscure the comprehensibility of the example for the present teaching, it is assumed here that the devices 25-1, 25-2 and 25-3 are located on top of each other, as illustrated in FIG. 1. The optical transmitter or beacon 26-1 at which the user is pointing at with remote control device 3 will be closest to the image sensor center 36 as indicated in FIG. 2. Based on this, the processor 6 of the remote control device 3 may select device 25-1 as being the device to be controlled, and starts keeping track of the signal transmitted by optical transmitter 26-1. Alternatively, other selection criteria may be used for selecting the device to be controlled. Moreover, this selection does not have to take place immediately upon receipt of one or more optical signals, but could take place simultaneous with other steps of the identification process or all at the end.

Signal processing in the remote control device 3 first detects the blob regions (=area, boundary of individual light spots) corresponding with optical transmitters 26-1, 26-2 and 26-3 in the image 35. Next blob position and intensity features are extracted from the detected blobs. From the sample image 35 illustrated in FIG. 2 it is possible to extract features such as position coordinate x in the image 35, position coordinate y in the image 35, intensity of each blob, wavelength, angle with respect to a central axis 20 (see FIG. 1), and possible other features that may contribute to identification and selection.

Figure 3:
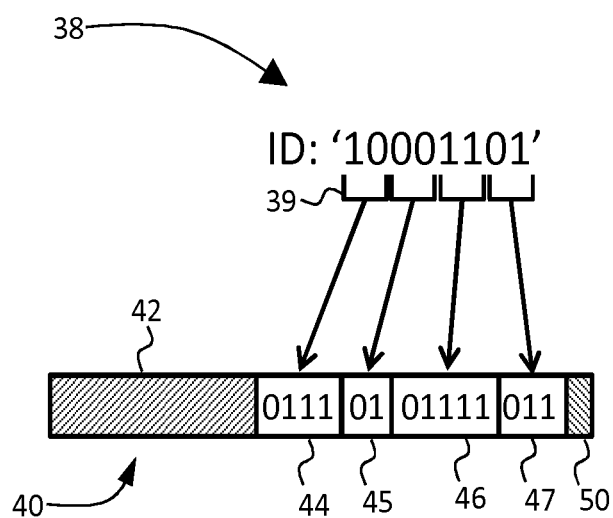
FIG. 3 schematically illustrates an optical signal in accordance with the present invention.

FIG. 3 illustrates, as an example, an encoding method in accordance with the present invention such as to encode an identifier of one of the user devices (25-1, 25-2, 25-3) into an optical signal for transmission. As may be appreciated, during analysis of a received optical signal from a user device, the user holding the remote control device 3 may usually not be able to hold the remote control device 3 completely still. Therefore, in case the user intends to control user device 25-1, as a result of motion of the hands of the user the optical signal corresponding with optical transmitter 26-1 (e.g. as illustrated in FIG. 2) will be moving in the image 35 during analysis. As will be explained below, the processor 6 of the remote control device 3 will keep track of the optical signal in the image received. As long as the optical signal is transmitted with a high signal state, keeping track of the optical signal corresponding with transmitter 26-1 in the image 35 may be straightforward using standard algorithms. However, as soon as the optical signal takes on a low signal state, the processor may no longer be able to keep track of the signal of optical transmitter 26-1 in the image 35. In particular, in case the high signal state and low signal state correspond to the optical transmitter being 'on' and 'off' in particular during the 'off' times, the optical signal may get lost. However, also in those cases where the optical signal is modulated between high and low intensities, but is not switched off completely during the low signal state, the signal-to-noise ratio (SNR) during the low signal states will still be considerably low in comparison with the SNR during the high signal state. Therefore, also in those cases where the optical signal in the low signals states is not completely switched off, but is transmitted as a low intensity optical signal, the processor 6 may still not be able to keep track of the optical signal. Moreover, the alternative identification method wherein the beacon is always in an on-state, but modulated with a sine wave or other code at low modulation index will suffer from a deteriorated SNR already, in particular due to the insensitive pixel boundaries of the optical sensor 5. For example, when a blob moves over the image sensor pixels, the blob brightness signal will vary when part of the blob passes the insensitive part between the pixels. Large amplitude noise will be introduced. As a results SNR becomes so bad that signal detection cannot be done reliable anymore.

To improve the performance of the system and reducing the risk of the optical signal getting lost while moving over pixels, on-off modulation is preferred. In order to optimize blob tracking, a code may be used with maximum number of 1's and minimal number of 0's. The present invention applies a coding method wherein the duration of the high signal states is much longer than the duration of the low signal states. Preferably, the duration of the low signal states is minimized in comparison to the duration of the high signal states. In the preferred embodiment, the low signal states have fixed and minimal durations and serve primarily as delimiters of the high signal states. The low signal states, in this case, enable the processor 6 to recognize the high signal states and to measure their duration in time. The information to be conveyed in this embodiment is encoded in the duration of the high signal states.

In FIG. 3, the optical signal comprises a plurality of signal fragments 42, 43, 45, 46, 47 and 50. Signal fragment 42 is the header fragment that precedes the payload signal fragments. Signal fragment 50 is a trailer signal fragment indicating the end of the optical signal 40. Identifier 38 consists of 8 bits: 1001101 (decimal: 141). The 8 bits of identifier 38 are separated by controller 28-1 of the user device 25-1 into bit pairs, such as bit pair 39. Each bit pair comprises two bits of the 8 bit identifier. As may be appreciated, in different implementations it is also possible to encode single bits or triplets of bits or a different number of bits; the number of bits encoded in each signal fragment may be chosen by the skilled person. Each bit pair such as bit pair 39, is encoded in a respective payload signal fragment 44, 45, 46, and 47. As referred to above, the bit pairs are encoded such that their information is conveyed in the duration of the high signal state of the optical signal 40. Therefore, the various possible bit configurations of each bit pair may be encoded such as indicated in table 1 below.

TABLE 1

| Signal fragment type | Channel symbol |
|---|---|
| Header | 011111 |
| Payload_00 | 01 |
| Payload_01 | 011 |
| Payload_10 | 0111 |
| Payload_11 | 01111 |
| Trailer | 0 |

With reference to the above table 1, bit pair 39 consisting of '10' is encoded into signal fragments '0111'. Likewise, the other bit pairs are encoded such as is indicated in FIG. 3 in signal fragments 45, 46, and 47. Finally, the optical signal is preceded by the header signal fragment 42 and terminated by the trailer signal fragment 50. All this may be performed by the controller 28-1 of user device 25-1. Then, the controller operates the modulator 30-1 for modulating the optical signal transmitted by optical transmitter 26-1.

Figure 4:
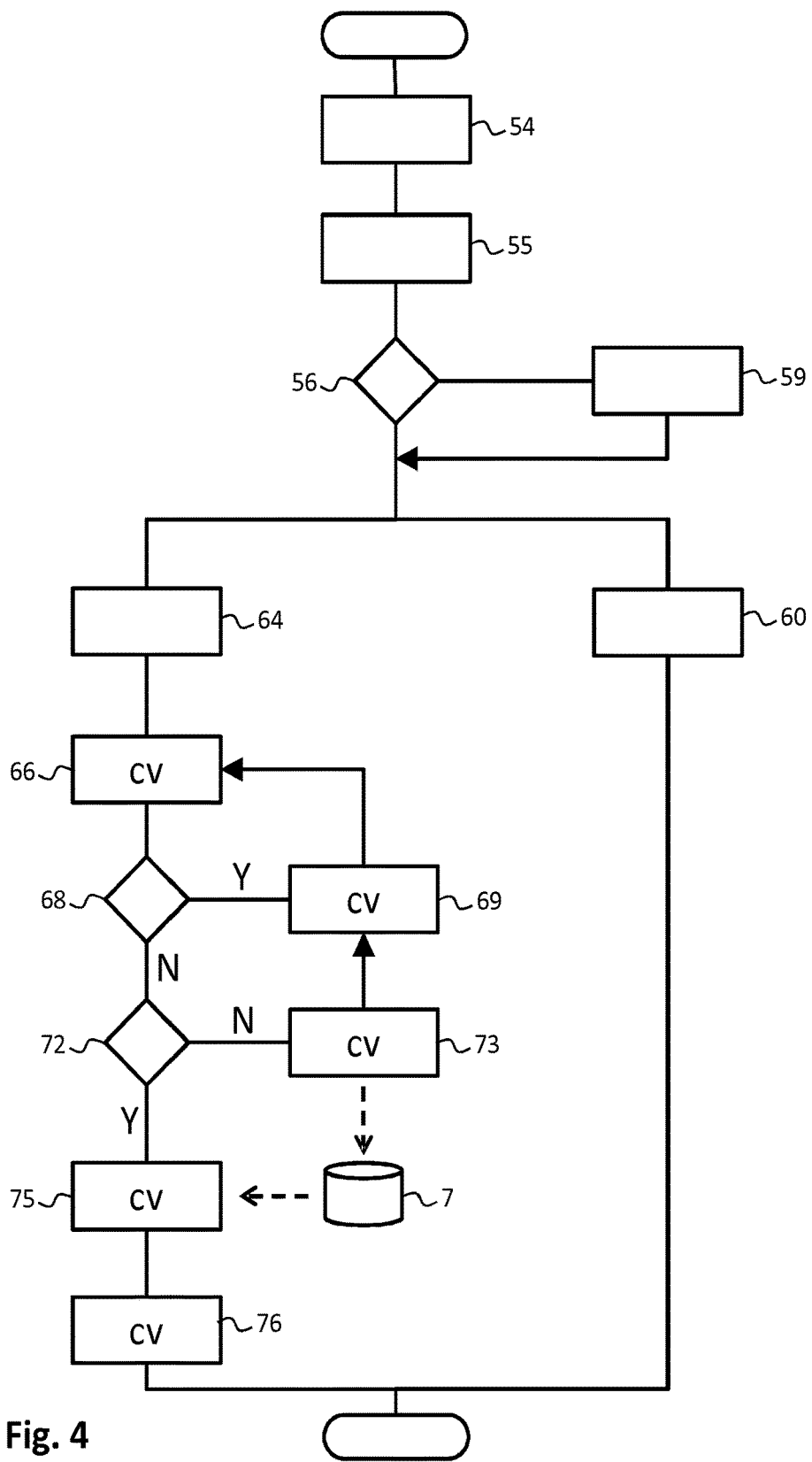
FIG. 4 schematically illustrates a method of operating a remote control device in accordance with the present invention.

FIG. 4 schematically illustrates a method of operating a remote control device 3 in accordance with the principles of the present invention. In FIG. 4, the method starts in step 54 by the remote control device 3 providing a trigger signal e.g. via the data communication unit 10 to all devices in the environment. Although the method in FIG. 4 starts with step 54, step 54 is an optional step of an implementation wherein a trigger signal is used for triggering the user devices 25-1 to 25-3 to start transmitting an optical identifier signal. This, however, is not essential and in a different implementation the optical identifier signals may for example continuously be sent in a repeating manner by the devices 25-1 to 25-3 and in that case, the remote control simply starts receiving the optical identifier signals in step 55 when the remote control device is pointed at the devices 25-1 to 25-3. A further option is that the optical identifier signal is repeated a predetermined number of times (e.g. 1×, 2×, 3×, 4×, 5×, 6×, . . . ) after receipt of a trigger by the devices 25-1 to 25-3 provided by remote control device 3. In order to prevent transmission pauses in between optical identifier signals, when repeating the optical identifier signal, after a trailer of the current optical identifier signal immediately the header of the next repeated optical identifier signal may be transmitted. In this case the leading zero of the header symbol overlaps with the trailer symbol of the previous identifier. Another option is that the remote control device is in sleep mode, and some internal trigger (e.g. the generated due to user operation of the remote control device 3) is required to wake-up the remote control device 3 to start receiving the optical signals in step 55. In any event, the optical signals transmitted by one or more user devices 25-1 to 25-3 are received in step 55 of the method in FIG. 4.

In step 56 it is determined by the processor whether the image contains only a single optical signal or whether multiple optical signals are present in the image received from the directional optical sensor 5. In case multiple optical signals are present in the image 35 received from optical sensor 5, a method continues in step 59 wherein at least one of the received optical signals is selected as the candidate optical signal for the user device to be controlled. As may be appreciated, dependent on the implementation also more than one received optical signal may be selected as a candidate signal. Moreover, the step of selection of the candidate signal may be performed either at the beginning of the method (as illustrated in FIG. 4) or during any of the subsequent steps, or even all at the end of the method.

Method step 60 and the sequence of steps 64 through 76 are then performed simultaneously, i.e. method step 60 resembles the processor 6 keeping track of the at least one optical signal selected in step 59, and the processor must keep track of this signal for as long as the optical signal is being received and analyzed.

While the processor 6 keeps track of the at least one optical signal, the processor also starts analyzing the at least one optical signal in steps 64 through 76. In step 64, the processor 6 recognizes the signal fragments that are present in the optical signal, e.g. by recognizing the locations of the low signal states in the optical signal considered. In step 66 the signal fragment being received is read by the processor, starting with the first signal fragment. In step 68, the processor determines whether a received signal fragment is a header type signal fragment. If the signal fragment is a header type signal fragment, the processor in step 69 waits for the next fragment and returns to step 66. In case the signal fragment read in step 66 is not a header type signal fragment, then in step 72 the processor determines whether the received signal fragment is a trailer type signal fragment. If the signal fragment is not a trailer type signal fragment, then in step 73 the processor establishes that the signal fragment is a payload type signal fragment, and decodes the signal fragment value represented. The signal fragment value is stored in memory 7 for later use. The method, after step 73, continues with step 69 (wait for the next signal fragment). If in step 72 the processor determines that a received signal fragment is a trailer type signal fragment, then the method continues in step 75 where the processor 6 retrieves the decoded and stored signal fragment values from the memory 7 and composes the identifier represented by the optical signal from these signal fragment values. Then in step 76, using the received identifier of the user device 25-1 the processor 6 identifies the user device 25-1, establishing which device this is. The identification method then ends, and may of course be followed (as usually will be the case) by the user controlling the user device 25-1.

Other feature of the proposed methods and arrangements may be that codes can be transmitted back-to-back, and a receiver can start decoding on the fly at any moment in time (so even halfway transmission code). In case waiting for a preamble is required, an average delay of 50% of transmission length may be introduced (maximum 100%). The proposed receiver starts decoding immediate, and saves average 50% transmission length detection time (maximum 100%). The receiver will be able to detect any complete fragment of back-to-back repeated code words.

Next steps, which are not shown in FIG. 4 but may follow upon the identification method, may for example be the selection of the correct control module 12 by the remote control device for controlling the identified user device 25-1. For example, various control modules may be present in the remote control device, either in hardware or software coded, and may be applied by the remote control device for controlling device 25-1. Alternatively, it is also possible that the remote control device, upon identifying the type of device 25-1, retrieves the correct control module and may be a relevant user interface, from an external source. This might be the server or management unit 21. It can receive such information from server 21 direct or indirect, i.e. server 21 might be part and hence connected to a larger network (and even intranet or internet). For example the remote control device may retrieve the control module or user interface from the device 25-1 itself, or it may be retrieved from a remote server. Then, upon receiving input from the user, the remote control device sends control commands to the user device 25-1 by means of the data communication unit 10, and the corresponding data communication unit 32-1 of user device 25-1.

Figure 5:
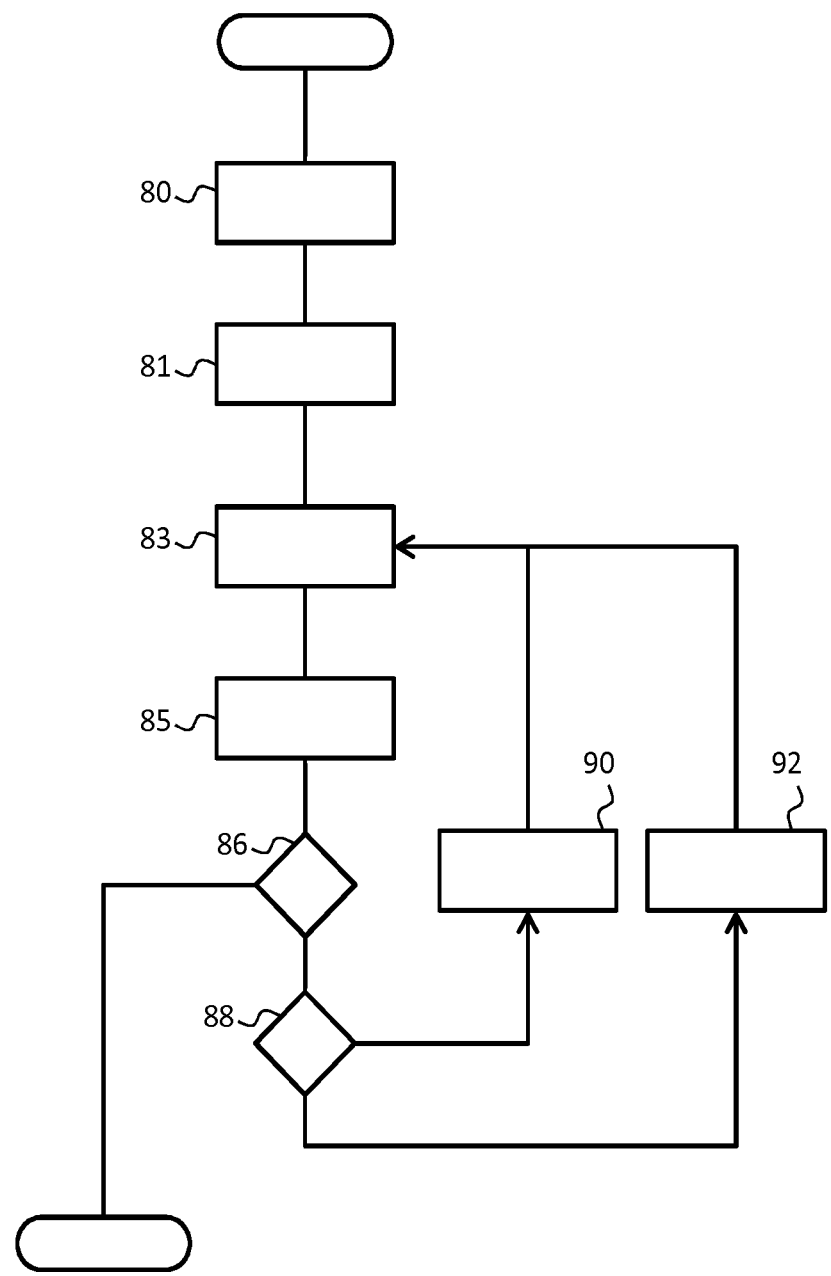
FIG. 5 schematically illustrates a method of operating a user device in accordance with the present invention.

In FIG. 5, a method of composing an optical signal for identification of a user device, such as may be applied in user device 25-1, is schematically illustrated. The method of FIG. 5 starts in step 80, where the user device identifier of user device 25-1 is separated into bit pairs. From the separated bit pairs, in step 81 the controller 28-1 of the user device 25-1 composes the signal fragments, preceded by a header type signal fragment and terminated by a trailer type signal fragment. In step 83, the controller 28-1 selects the fragments to be sent (e.g. header first, second, third . . . etc.). Then in step 85, the controller operates the modulator 30-1 in accordance with the bits of which the signal fragments considered is composed. The modulator applies a high signal state when it receives a '1' from the controller 28-1, and it applies a low signal state when it receives a '0' from the controller 28-1. Thus in step 85, the optical signal is transmitted by the optical transmitter 26-1, which is connected to the modulator and receives the high and low signal states.

In step 86, the controller 28-1 may verify whether the method can be stopped. For example, this may be in response to receiving a interrupt signal, or in response to any other event taking place within user device 25-1. Usually, the optical signal will be retransmitted from start after the last signal fragment (the trailer signal fragment) has been transmitted. A guarding interval is not desired in order to maintain tracking. Alternatively, at some point the controller 28-1 may decide that transmission is no longer necessary, and may stop the transmission in step 86. In other embodiments, the user devices 25-1 may be arranged for continuously transmitting the optical signal without stopping. In case the method does not have to be stopped in step 86, it continues in step 88 wherein the controller 28-1 determines whether the transmitted signal fragment was a trailer signal fragment. If the last transmitted signal fragment was a trailer signal fragment, the method continues in step 90 wherein transmission is restarted from the first signal fragment of the optical signal. Step 90 is thus a restart step, and the method continues again in step 83 (selection of the signal fragment to be sent). If in step 88 it is determined that the last sent signal fragment is not a trailers type signal fragment the method continues in step 92 indicating to the controller that the next signal fragment is to be selected for transmission. Thereafter, the method again continues in step 83. Optionally, the device 25-1 or the remote control 3 may provide user feedback. For example, on the device a LED signal or other indicator (e.g. visible or audible) may be provided after selection or after becoming selection candidate.

Another option that may be implemented is the possibility to select more than one optical signal (blob) in a single selection action. This may for example be indicated prior to performing the identification and analysis steps. For example, all blob positions and identification information may be in the memory 7 of the remote control 3. Alternatively, this data may be obtained by the remote control device 7 from the server 21. Selection of optical identifier signals could be based on a relation between their positions or identification codes. Possibilities are for example the selection of a group of devices (each device equipped with single beacon) or detection of an orientation of a device relative to the remote control and/or a room. In this latter case, device 25-1 can be equipped with number of beacons that for example transmit the same device identifier for allowing the remote control device 3 to recognize and select all corresponding signals. From the image, if the remote control device 3 is aware of the positions of each optical transmitter on the device 25-1, the orientation may be calculated (with or without aid from the server 21).

The present invention has been described in terms of some specific embodiments thereof. It will be appreciated that the embodiments shown in the drawings and described herein are intended for illustrated purposes only and are not by any manner or means intended to be restrictive on the invention. For example, the method steps illustrated in the figures and described above only represent a possible implementation of the invention. The order in which the steps are performed may be different, and even some steps may be dispensed with in a different implementation. The context of the invention discussed here is merely restricted by the scope of the appended claims.

The invention claimed is:

1. A remote control device for controlling one or more user devices, comprising input means for receiving input from a user, and a transmitter for transmitting control commands to said one or more user devices for control thereof, further comprising a directional optical sensor for receiving one or more optical signals from the user devices and for detecting an incoming direction of said received optical signals, and a processor, wherein, for identification of at least one of said user devices, the processor is arranged for analyzing at least one of said received optical signals for associating thereof with the at least one of said user devices, wherein the one or more optical signals comprise high and low signal states, and wherein each optical signal consists of a plurality of signal fragments, each signal fragment comprising a leading or trailing low signal state and a high signal state, wherein a duration of the high signal state of each signal fragment determines a signal fragment type of the signal fragment and wherein said duration of the high signal state is longer than a duration of the low signal state in each signal fragment, and wherein said duration of the high signal state is different in each signal fragment, in that the processor is arranged for keeping track of the at least one of said optical signals upon changing of said incoming direction, and for performing said associating of said at least one received optical signal with the at least one of said user devices by:

recognizing the one or more signal fragments and associating each signal fragment with its signal fragment type for obtaining therefrom a signal pattern which is uniquely associable with said at least one of said user devices, comprising:

decoding a signal fragment value represented in each of the one or more signal fragments having a payload data type, and combining the signal fragment values for obtaining a binary identifier associated with the at least one of said user devices.

2. Remote control device according to claim 1, wherein the leading or trailing low signal states of the signal fragments are of a fixed duration which is minimized with respect to said duration of said high signal state, and wherein the processor is arranged for detecting the low signal states for distinguishing said one or more signal fragments within the at least one received optical signal.

3. Remote control device according to claim 1, wherein the received optical signals represent binary signals formed of sequences of bits, wherein for each signal fragment the high signal states are formed of one or more high bits and the low signal states are formed of at least one low bit, wherein the processor is arranged for determining the number of consecutive high bits from each signal fragment, and for determining the signal fragment type from the number of high bits.

4. Remote control device according to claim 1, wherein the processor is arranged for selecting the at least one of said received optical signals for analyzing thereof, wherein the selection is dependent on a detected incoming direction of said received optical signals.

5. Remote control device according to claim 1, wherein the directional optical sensor comprises at least one element of a group comprising: a camera for providing images to the processor for performing said analysis, an arrangement of p-i-n photodiodes.

6. A user device arranged for being operated by means of a remote control device in accordance with claim 1, wherein the user device comprises:

a receiver for receiving control commands from said remote control device for control of said user device, an optical transmitter for transmitting an optical signal, and a modulator cooperating with the optical transmitter for modulating the optical signal such that it comprises high and low signal states, and such that each optical signal consists of a plurality of signal fragments, each signal fragment comprising a leading or trailing low signal state and a high signal state, wherein a duration of the high signal state of each signal fragment determines a signal fragment type of the signal fragment and wherein said duration of the high signal state is longer than a duration of the low signal state, and wherein said duration of the high signal state is different in each signal fragment, a controller adapted to encode a binary identifier associated with the user device as a plurality of payload signal fragments of the plurality of signal fragments, the controller being further adapted to cooperate with the modulator for enabling modulation of the optical signal in accordance with a signal pattern formed by the plurality of signal fragments together and consisting of signal fragments of a combination of signal fragment types.

7. User device according to claim 6, wherein the leading or trailing low signal states of the signal fragments are of a fixed duration which is minimized with respect to said duration of said high signal state.

8. User device according to claim 6, wherein the modulator is arranged for modulating the optical signals such as to represent binary signals formed of sequences of bits, wherein for each signal fragment the high signal states are formed of one or more high bits and the low signal states are formed of at least one low bit, the controller being further arranged for converting sequences of one or more bits representing an identifier into signal fragments consisting of at least one low bit and a plurality of high bits, the number of high bits representing a signal fragment type.

9. User device according to claim 6, the user device comprises a plurality of optical transmitters for transmitting said optical signal, for enabling the remote control device to establish a spatial orientation or location of said user device.

10. System comprising at least one remote control device in accordance with claim 1.

11. The user device according to claim 6, wherein the controller is adapted to separate the binary identifier into groupings of two or more bits, and to encode each or said groupings in a respective payload signal fragment of said plurality.

12. A method of composing an optical signal for identification in a user device comprising an optical transmitter, the user device being arranged for being operated by means of a remote control device of claim 1, wherein the method comprises:

encoding, using a controller, a binary identifier associated with the user device as a plurality of payload signal fragments;

modulating, using a modulator cooperating with the optical transmitter, an optical signal such that it comprises high and low signal states, and such that each optical signal consists of a plurality of signal fragments, each signal fragment comprising a leading or trailing low signal state and a high signal state, wherein a duration of the high signal state of each signal fragment determines a signal fragment type of the signal fragment wherein said duration of the high signal state is different in each signal fragment, wherein said duration of the high signal state is longer than a duration of the low signal state, wherein the plurality of signal fragments includes the plurality of payload signal fragments, and enabling modulation of the optical signal, using the controller cooperating with the modulator, in accordance with a signal pattern formed by the plurality of signal fragments together and consisting of signal fragments of a combination of signal fragment types; and transmitting the optical signal by means of the optical transmitter.

13. A method of operating a remote control device for controlling one or more user devices, the method comprising:
in a remote control device:
receiving, by a directional optical sensor, one or more optical signals from the one or more user devices,
wherein, the one or more optical signals comprise high and low signal states and one or more signal fragments,
wherein each signal fragment comprises a leading or trailing low signal state and a high signal state,
wherein a duration of a high signal state of each signal fragment determines a signal fragment type of the signal fragment,
wherein the duration of the high signal state is longer than a duration of the low signal state,
wherein the duration of the high signal state is different in each signal fragment,
detecting, by said processor, an incoming direction of said received optical signals;
identifying, by a processor, at least one of said user devices by analyzing, by said processor, at least one of said received optical signals for associating thereof with the at least one of said user devices, comprising:

(a) recognizing of the one or more signal fragments
(b) associating each recognized signal fragment with its signal fragment type for obtaining therefrom a signal pattern which is uniquely associable with said at least one of said user devices,
(c) decoding a signal fragment value represented in each of the one or more recognized signal fragments having a payload data type, and
(d) combining the signal fragment values from each of the respective recognized signal fragments for obtaining a binary identifier associated with the at least one of said user devices.

14. The method of claim 13, further comprising, the processor keeping track of the at least one of said optical signals upon changing of incoming direction.

15. A non-transitory computer storage medium comprising a computer program including a set of instructions executable by a processor, that, when executed by a remote control device comprising a directional optical sensor and said processor, causes the remote control device to perform the method of claim 13.

* * * * *